No. 878,035. PATENTED FEB. 4, 1908.
H. BAUMGARTNER-MIČA.
CONE FRICTION COUPLING.
APPLICATION FILED OCT. 2, 1905.

2 SHEETS—SHEET 1.

Witnesses
Alfred Bosshardt
Stanley E. Bramall

Inventor
Hugo Baumgartner-Miča
Per J. Bosshardt.
Attorney.

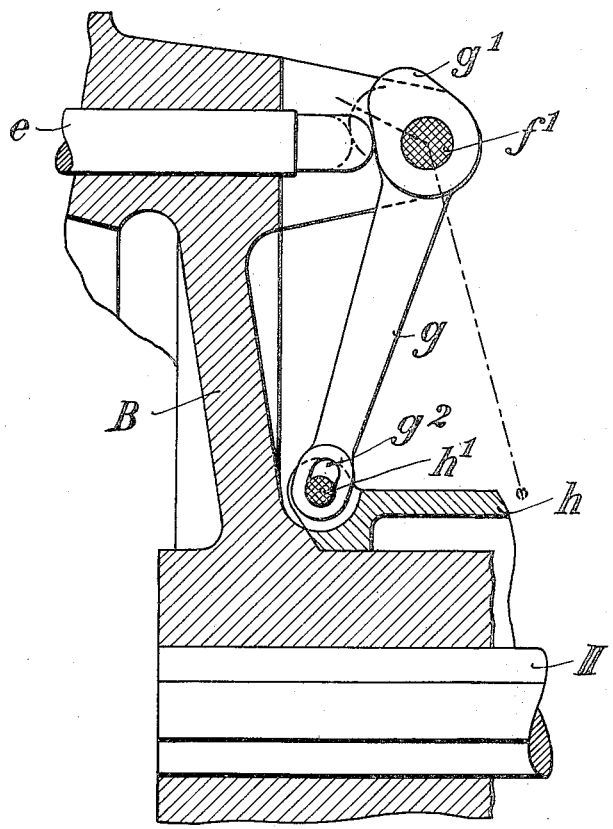

UNITED STATES PATENT OFFICE.

HUGO BAUMGARTNER-MIČA, OF BASEL, SWITZERLAND.

CONE FRICTION-COUPLING.

No. 878,035.        Specification of Letters Patent.        Patented Feb. 4, 1908.

Application filed October 2, 1905. Serial No. 281,088.

*To all whom it may concern:*

Be it known that I, HUGO BAUMGARTNER-MIČA, citizen of Switzerland, residing at Basel, Switzerland, have invented new and useful Improvements in Cone Friction-Couplings, of which the following is a specification.

This invention relates to a cone friction coupling which has a double cone slidable upon the driving member and a pulley having internally a cone ring secured upon the driven member and a cone ring by means of bolts slidably mounted on the said pulley cone ring and under the influence of springs. The slidable cone ring and the said double cone are pressed, by the said springs, against the said pulley cone ring and thus brought in frictional contact with each other. The said slidable ring carries other bolts passing through corresponding holes in the said pulley cone ring which serve as disengaging bolts and are actuated by suitable members fulcrumed to the said pulley cone ring.

Springs are also employed which tend to move the said double cone out of frictional contact with the said pulley cone ring when uncoupling. I attain this by the mechanism illustrated in the accompanying two sheets of drawings, in which—

Figure 2:
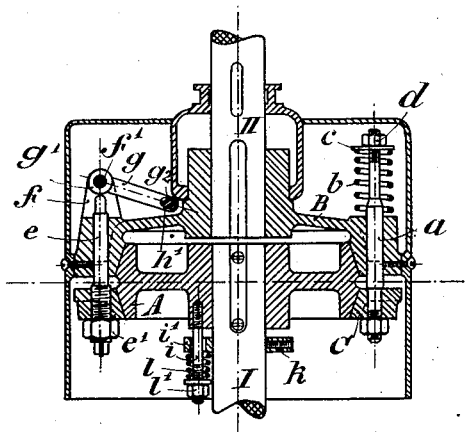
Figure 1:
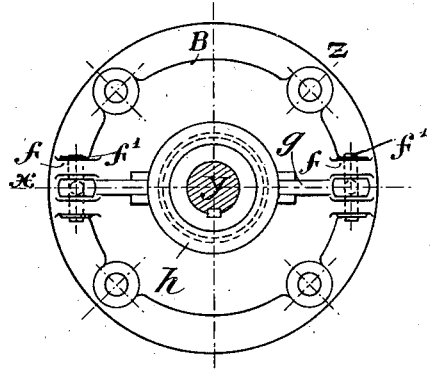

Figure 1 is a side view and Fig. 2 a longitudinal section on line $x, y, z$ of Fig. 1, of one form in which my invention may be carried out. Fig. 3 is a detached longitudinal section on an enlarged scale.

Similar letters refer to similar parts throughout the several views.

A is the double cone slidable on the shaft I.

B is the pulley to be coupled keyed upon the shaft II, and C the cone ring pressed against the double cone A and by bolts $a$ slidably connected with the pulley B. Upon the bolts $a$ are springs $b$ capable of being tensioned by means of the washer $c$ and nut $d$.

$e$ are disengaging bolts screwed into the slidable cone ring C and held fast therein by lock nuts $e'$. In eyes on the pulley cone ring B studs $f'$ are employed which receive the levers $g$, each having a cam projection $g'$ on its boss.

$h$ is a disengaging sleeve having screwed therein a stud $h'$ engaging in the slots $g^2$ of the levers $g$. In the boss of the double cone are secured two screws $i$ passing through corresponding holes in a ring $k$ secured upon the shaft I. These screws carry each a spring $l$ and a washer and nut $l'$ for tensioning the springs $l$ so that when the coupling is out of frictional contact, the double cone is drawn back against the ring $k$.

The cone friction coupling described operates as follows: Normally the double cone A is held in frictional contact with the pulley cone ring B through the medium of the cone ring C, bolts $a$ and springs $b$, the two shafts I & II being then coupled up. When it is desired to uncouple the said shafts the sleeve $h$ is moved outwards which causes the cams $g'$ on the levers $g$ to depress the bolts $e$ and thereby push the cone ring C out of contact with the double cone A. In the meantime the double cone A is drawn by the springs $l$ against the ring $k$ and the cone ring C having been pushed clear of the cone A the shafts I & II are completely uncoupled.

What I claim as my invention and desire to secure by Letters Patent, is—

In a double cone friction coupling, a driving shaft and a driven shaft in line with each other, a single cone secured to the said driven shaft and having holes, a single cone ring slidable on the said cone, a double cone slidably secured to the said driving shaft to rotate the said single cone and cone ring, bolts secured to the said cone ring passing through the said holes and springs thereon for holding the said cone ring in contact with one side of the said double cone and the other side of the latter in contact with the said single cone, means for moving the said cone ring out of contact with the said double cone and springs for moving the latter out of contact with the said single cone, all combined substantially as and for the purpose set forth.

In testimony whereof I have signed my name to this specification in the presence of two subscribing witnesses.

HUGO BAUMGARTNER-MIČA.

Witnesses:
    GEORGE GIFFORD,
    FRITZ CHRISTEN.